Patented May 16, 1939

2,158,890

UNITED STATES PATENT OFFICE 2,158,890

CONNECTION DEVICE

Louis Xavier Antelme, Paris, France

Application November 12, 1936, Serial No. 110,525
In France November 13, 1935

2 Claims. (Cl. 287—85)

The present invention relates to a connection device serving as a shock and vibration absorber in particular for fixing apparatus and other delicate members on ships, boats, aircraft, automobile vehicles, or the like.

This device which is of great sensitiveness, comprises essentially, two spindles one of which is rigidly mounted on any support and the other integral with the member or apparatus which it is desired to fix in a flexible manner, these two spindles being connected to an intermediate piece either by rubber diaphragms or any other suitable elastic material combined with one or more springs, or by a single closed diaphragm containing a body or fluid of shock absorbing character in such manner that the vibrations or shocks transmitted to the fixed spindle are deadened in tension by the elastic members, while the springs or the fluid enclosed by these diaphragms operate when the device is under compression. This device which may be used horizontally or vertically, furthermore permits a certain play between the spindles with respect one to the other both angularly and in all directions.

On the annexed drawing given by way of example;

Figure 1:
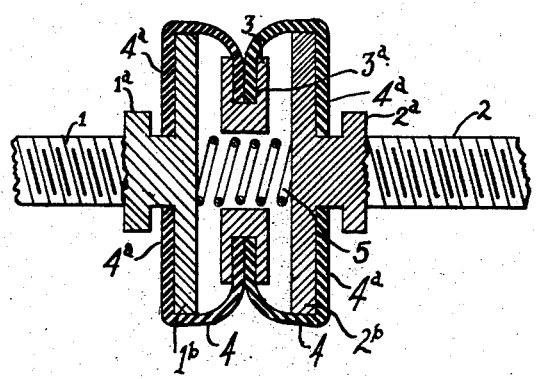
Fig. 1 is a vertical section of a device according to this invention, the spindles or axes of which are connected to the intermediate part by two diaphragms combined with a single central spring.
Figure 2:
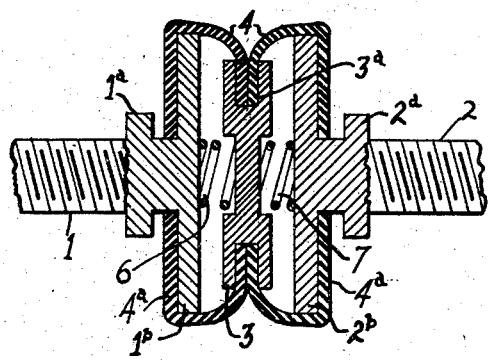
Fig. 2 is a view similar to that of Fig. 1, the intermediate piece being combined with two springs.
Figure 3:
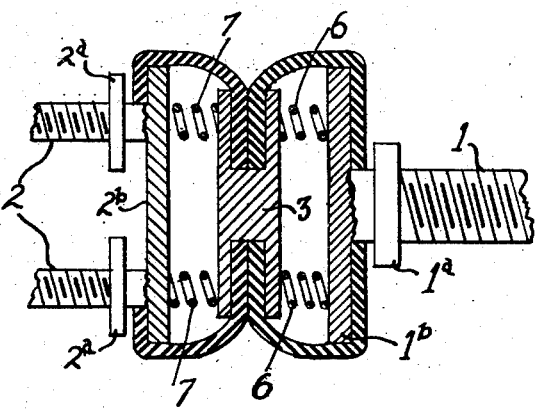
Fig. 3 represents a device comprising a plurality of springs acting in compression and fixed by a single spindle on one side and two spindles on the other side.

Two screw threaded spindles 1 and 2 each have a collar 1a and 2a and are terminated by discs 1b, 2b. These spindles 1 and 2 are connected through their discs 1b, 2b, as shown in Figures 1 and 2, to an intermediate piece 3 by two elastic diaphragms 4 of rubber or any other suitable material, one of the edges 4a of which engages in the annular space formed on the spindles between the collars 1a, 2a and the discs 1b, 2b, while the other edge of these diaphragms engages in an annular channel 3a formed in the intermediate piece 3 which may be combined with a single spring 5 passing through a central aperture made in this said intermediate piece 3 and the extremities of which spring 5 bear against the walls of the discs 1b, 2b, Fig. 1. According to another embodiment, Fig. 2, the intermediate piece 3 may comprise two oppositely located recesses intended each to receive one end of two springs 6 and 7 respectively.

The use of one or more of these devices placed in any position, vertical or horizontal, permits a member or apparatus to be connected by means of a flexible fastening to a fixed part. If, in fact, one of the spindles, 1 for example, is mounted on the fixed part and if the object to be connected thereto is made integral with the spindle 2, it will be easily seen that the device will absorb all the shocks and vibrations which may be transmitted to the mixed part and to the spindle 1. The diaphragms 4 by their elastic resistance neutralize progressively the tensile forces, while the springs 6 and 7 or the spring 5 dampen on the return, the shocks of compression. The diaphragms 4 react also with torsional stresses and permit, to a certain extent, the discs to be displaced angularly with respect to each other.

This device, the uses of which are numerous and varied, may serve for the elastic mounting of objects or members of all kinds, and may in particular be utilised for the mounting of the delicate apparatus used in aviation such as gyroscopes and the like or for mounting the equipment required in navigation.

Naturally, recourse may be had if necessary to other methods and other forms of execution without departing from the scope of this invention.

It will be also possible, to vary details of construction and mounting according to circumstances and applications.

On the other hand, the various elements constituting this invention may be replaced by others playing the same part or giving the same result.

It is also understood that any process, material and product adapted to serve for the manufacture of these devices may be utilised.

I claim:

1. A connection device of the character described comprising a pair of spindles, a pair of discs each mounted on one end of each of said spindles, a circular member having a bore formed through its central portion, a pair of elastic members each connecting one of said discs to said circular member for supporting said circular member in a position relative to and between said discs and resilient means positioned through and guided by the bore of said circular member and having each end against a face of one of said discs.

2. A connection device of the character described comprising a pair of spindles, a pair of discs each mounted on one end of each of said spindles, elastic means connected to each of said discs, a circular member having a bore formed through its central portion and being supported relative to and between said discs by said elastic means and a spring positioned through and guided by the bore of said circular member and having each end against a face of one of said discs.

LOUIS XAVIER ANTELME.